United States Patent
Aguilar et al.

(10) Patent No.: US 6,799,316 B1
(45) Date of Patent: Sep. 28, 2004

(54) VIRTUALIZING HARDWARE WITH SYSTEM MANAGEMENT INTERRUPTS

(75) Inventors: Maximino Aguilar, Austin, TX (US); Sanjay Gupta, Austin, TX (US); Roy Moonseuk Kim, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,427

(22) Filed: Mar. 23, 2000

(51) Int. Cl.[7] .............................................. G06F 9/455
(52) U.S. Cl. ............................ 718/1; 710/260; 703/21; 719/310
(58) Field of Search .............................. 703/21; 718/1; 719/310; 709/1, 100, 310–330; 710/260–269; 712/227, 244

(56) References Cited

U.S. PATENT DOCUMENTS

| | | | | |
|---|---|---|---|---|
| 5,647,056 A | * | 7/1997 | Barrett et al. ................ | 709/220 |
| 5,864,705 A | * | 1/1999 | Behnke ......................... | 712/32 |
| 5,937,185 A | * | 8/1999 | Weir et al. .............. | 395/500.45 |
| 6,006,029 A | * | 12/1999 | Bianchi et al. ......... | 395/500.45 |

* cited by examiner

Primary Examiner—St. John Courtenay, III
Assistant Examiner—George L. Opie
(74) Attorney, Agent, or Firm—Duke W. Yee; Casimer K. Salys; Stephen J. Walder, Jr.

(57) ABSTRACT

Initially, a SMI trap detects an application accessing a memory location associated with a physical hardware device. The SMI trap receives the device address for the address bus and compares that address with memory addresses for hardware devices being virtualized by virtual device simulators. If the address matches an available virtual device, the SMI caches the address, hooks and caches the corresponding IO instruction for the memory address and issues a SMI. A SMI handler receives the SMI and determines which virtual device simulator to call. Once activated by the SMI handler, the virtual device simulator interacts with the application and then returns control to the processor.

20 Claims, 7 Drawing Sheets

| ADDRESS | FIRST QUAD (xx0h TO xx3h) | SECOND QUAD (xx4h TO xx7h) | THIRD QUAD (xx8h TO xxBh) | FOURTH QUAD (xxCh TO xxFh) |
|---|---|---|---|---|
| 000-00Fh | DMA CONTROLLER, CHANNELS 0 TO 3 ||||
| 010-01Fh | (SYSTEM USE) ||||
| 020-02Fh | INTERRUPT CONTROLLER #1 (020-021h) | (SYSTEM USE) |||
| 030-03Fh | (SYSTEM USE) ||||
| 040-04Fh | SYSTEM TIMERS | (SYSTEM USE) |||
| 050-05Fh | (SYSTEM USE) ||||
| 060-06Fh | KEYBOARD AND PS/2 MOUSE (060h), SPEAKER (061h) | KEYBOARD AND PS/2 MOUSE (064h) |||
| 070-07Fh | RTC/CMOS, NMI (070-071h) | (SYSTEM USE) |||
| 080-08Fh | DMA PAGE REGISTER 0-2 (081-083h) | DMA PAGE REGISTER 3 (087h) | DMA PAGE REGISTER 4-6 (089-08Bh) | DMA PAGE REGISTER 7 (08Fh) |
| 090-09Fh | (SYSTEM USE) ||||
| 0A0-0AFh | INTERRUPT CONTROLLER #2 (0A0-0A1h) | (SYSTEM USE) |||
| 0B0-0BFh | (SYSTEM USE) ||||
| 0C0-0CFh | DMA CONTROLLER, CHANNELS 4-7 (0C0-0DFh, BYTES 1-16) ||||
| 0D0-0DFh | DMA CONTROLLER, CHANNELS 4-7 (0C0-0DFh, BYTES 17-32) ||||
| 0E0-0EFh | (SYSTEM USE) ||||
| 0F0-0FFh | FLOATING POINT UNIT (FPU/NPU/MATH COPROCESSOR) ||||
| 100-10Fh | (SYSTEM USE) ||||
| 110-11Fh | (SYSTEM USE) ||||
| 120-12Fh | (SYSTEM USE) ||||
| 130-13Fh | SCSI HOST ADAPTER, (130-14Fh, BYTES 1 TO 16) ||||
| 140-14Fh | SCSI HOST ADAPTER, (130-14Fh, BYTES 17 TO 32) ||||
| | SCSI HOST ADAPTER, (140-15Fh, BYTES 1 TO 16) ||||
| 150-15Fh | SCSI HOST ADAPTER, (140-15Fh, BYTES 17-32) ||||
| 160-16Fh | | | QUATERNARY IDE CONTROLLER, MASTER DRIVE ||
| 170-17Fh | SECONDARY IDE CONTROLLER, MASTER DRIVE ||||
| 180-18Fh | ||||
| 190-19Fh | ||||
| 1A0-1AFh | ||||
| 1B0-1BFh | ||||
| 1C0-1CFh | ||||
| 1D0-1DFh | ||||
| 1E0-1EFh | | | TERTIARY IDE CONTROLLER, MASTER DRIVE ||
| 1F0-1FFh | PRIMARY IDE CONTROLLER, MASTER DRIVE ||||

FIG. 7B

| Range | Col A | Col B | Col C |
|---|---|---|---|
| 200-20Fh | JOYSTICK PORT | | (SYSTEM USE, 20C-20Dh) |
| 210-21Fh | | | |
| 220-22Fh | SOUND CARD | | |
| | SCSI HOST ADAPTER, (220-23Fh, BYTES 1 TO 16) | | |
| 230-23Fh | SCSI HOST ADAPTER, (220-23Fh, BYTES, 17 TO 32) | | |
| 240-24Fh | SOUND CARD | | |
| | NON-NE2000 NETWORK CARD | | |
| | NE2000 NETWORK CARD (240-25Fh, BYTES 1 TO 16) | | |
| 250-25Fh | NE2000 NETWORK CARD (240-25Fh, BYTES 17 TO 32) | | |
| 260-26Fh | SOUND CARD | | |
| | NON-NE2000 NETWORK CARD | | |
| | NE2000 NETWORK CARD (260-27Fh, BYTES 1 TO 16) | | |
| 270-27Fh | (SYSTEM USE) | PLUG AND PLAY DEVICES | LPT2 (SECOND PARALLEL PORT) (COLOR SYSTEMS) |
| | | | LPT3 (THIRD PARALLEL PORT) (MONOCHROME SYSTEMS) |
| | NE2000 NETWORK CARD (260-27Fh, BYTES 17 TO 32) | | |
| 280-28Fh | NON-NE2000 NETWORK CARD | | |
| | NE2000 NETWORK CARD (280-29Fh, BYTES 1 TO 16) | | |
| 290-29Fh | NE2000 NETWORK CARD (280-29Fh, BYTES 17 TO 32) | | |
| 2A0-2AFh | NON-NE2000 NETWORK CARD | | |
| | NE2000 NETWORK CARD (2A0-2BFh, BYTES 1 TO 16) | | |
| 2B0-2BFh | NE2000 NETWORK CARD (2A0-2BFh, BYTES 17 TO 32) | | |
| 2C0-2CFh | | | |
| 2D0-2DFh | | | |
| 2E0-2EFh | | | COM4 (FOURTH SERIAL PORT) |
| 2F0-2FFh | | | COM2 (SECOND SERIAL PORT) |
| 300-30Fh | SOUND CARD (MIDI PORT) (300-301h) | | |
| | NON-NE2000 NETWORK CARD | | |
| | NE2000 NETWORK CARD (200-31Fh, BYTES 1 TO 16) | | |
| 310-31Fh | NE2000 NETWORK CARD (200-31Fh, BYTES 17 TO 32) | | |
| 320-32Fh | NON-NE2000 NETWORK CARD | | |
| | NE2000 NETWORK CARD (320-33Fh, BYTES 1 TO 16) | | |
| | HARD DISK CONTROLLER ON OLD PC/XT | | |

FIG. 7C

| Range | | | |
|---|---|---|---|
| 330-33Fh | SOUND CARD (MIDI PORT) (330-331h) | | |
| | NE2000 NETWORK CARD (320-33Fh, BYTES 17 TO 32) | | |
| | SCSI HOST ADAPTER, (330-34Fh, BYTES 1 TO 16) | | |
| 340-34Fh | SCSI HOST ADAPTER, (330-34Fh, BYTES 17 TO 32) | | |
| | SCSI HOST ADAPTER, (340-35Fh, BYTES 1 TO 16) | | |
| | NON-NE2000 NETWORK CARD | | |
| | NE2000 NETWORK CARD (340-35Fh, BYTES 1 TO 16) | | |
| 350-35Fh | SCSI HOST ADAPTER, (340-35Fh, BYTES 17 TO 32) | | |
| | NE2000 NETWORK CARD (340-35Fh, BYTES 17 TO 32) | | |
| 360-36Fh | TAPE ACCELERATOR CARD (360h) | | QUATERNARY IDE CONTROLLER (SLAVE DRIVE) (36E-36Fh) |
| | NON-NE2000 NETWORK CARD | | |
| | NE2000 NETWORK CARD (360-37Fh, BYTES 1 TO 16) | | |
| 370-37Fh | TAPE ACCELERATOR CARD (370h) | SECONDARY IDE CONTROLLER (SLAVE DRIVE) (376-377h) | LPT1 (FIRST PARALLEL PORT) (COLOR SYSTEMS) |
| | | | LPT2 (SECOND PARALLEL PORT) (MONOCHROME SYSTEMS) |
| | NE2000 NETWORK CARD (360-37Fh, BYTES 1 TO 16) | | |
| 380-38Fh | | SOUND CARD (FM SYNTHESIZER) | |
| 390-39Fh | | | |
| 3A0-3AFh | | | |
| 3B0-3BFh | VGA/MONOCHROME VIDEO | | LPT1 (FIRST PARALLEL PORT) (MONOCHROME SYSTEMS) |
| 3C0-3CFh | VGA/EGA VIDEO | | |
| 3D0-3DFh | VGA/CGA VIDEO | | |
| 3E0-3EFh | TAPE ACCELERATOR CARD (3E0h) | | COM3 (THIRD SERIAL PORT) |
| | | | TERIARY IDE CONTROLLER (SLAVE DRIVE) (3EE-3Efh) |
| 3F0-3FFh | TAPE ACCELERATOR CARD (3F0h) | PRIMARY IDE CONTROLLER (SLAVE DRIVE) (3F6-3F7h) | |

FIG. 8

SMI HANDLER
ACTION TABLE
800

| DEVICE ADDRESS (SMI OR SMI TRAP CACHE) | VIRTUAL HARDWARE SIMULATOR | ACTION TAKEN |
|---|---|---|
| 000-00Fh | NOT ASSIGNED | |
| 010-01Fh | NOT ASSIGNED | |
| 020-02Fh | NOT ASSIGNED | |
| 030-03Fh | NOT ASSIGNED | |
| 040-04Fh | NOT ASSIGNED | |
| 050-05Fh | NOT ASSIGNED | |
| 060-06Fh | KEYBOARD AND PS/2 MOUSE | CALL KEYBOARD AND PS/2 SIMULATION ALGORITHM [DETERMINE KEY STROKE, CALL CONVERSION FOR THAT KEY STROKE, RETURN CONVERTED KEY STROKE TO APPLICATION] |
| 070-07Fh | RTC | READ SERVER SYSTEM CLOCK, RETURN TO APPLICATION |
| 080-08Fh | NOT ASSIGNED | |
| 090-09Fh | NOT ASSIGNED | |
| 0A0-0AFh | NOT ASSIGNED | |
| 0B0-0BFh | NOT ASSIGNED | |
| 0C0-0CFh | NOT ASSIGNED | |
| 0D0-0DFh | NOT ASSIGNED | |
| 0E0-0Efh | NOT ASSIGNED | |
| 0F0-0FFh | NOT ASSIGNED | |
| 100-10Fh | NOT ASSIGNED | |
| 110-11Fh | NOT ASSIGNED | |
| 120-12Fh | NOT ASSIGNED | |
| 130-13Fh | NOT ASSIGNED | |
| 140-14Fh | NOT ASSIGNED | |
| 150-15Fh | NOT ASSIGNED | |
| 160-16Fh | NOT ASSIGNED | |
| 170-17Fh | NOT ASSIGNED | |
| 180-18Fh | NOT ASSIGNED | |
| 190-19Fh | NOT ASSIGNED | |
| 1A0-1AFh | NOT ASSIGNED | |
| 1B0-1BFh | NOT ASSIGNED | |
| 1C0-1CFh | NOT ASSIGNED | |
| 1D0-1DFh | NOT ASSIGNED | |
| 1E0-1EFh | NOT ASSIGNED | |
| 1F0-1FFh | NOT ASSIGNED | |

VIRTUALIZING HARDWARE WITH SYSTEM MANAGEMENT INTERRUPTS

BACKGROUND OF THE INVENTION

1. Technical Field

The present invention relates to information computing technology. More particularly, the present invention relates to providing means for virtualizing hardware that is not available to a system.

2. Description of Related Art

The proliferation of computing devices within all organizational levels has reached some critical facilities management and cost limits. Many organizations' IT (Information Technology) professionals are being inundated with heterogenous IS (Information Systems) requirements while being constrained with stringent budgetary requirements. Many times IT professional are forced to choose between competing IS strategies for maintaining the IT system. Many times a decision is made to upgrade only the desktop systems and applications that are considered mission critical while merely maintaining other legacy systems on an ad hoc basis. These IS strategies greatly reduce the network's efficiency because network servers must support a wide variety of desktop systems and applications. Additionally, overall IT expenses increase dramatically as the support bandwidth increases for supporting these heterogenous systems.

Total cost of ownership (TCO) is the catch phrase for many current IT professionals and their supervisors. TCO is the cost of using a computer. It includes the cost of the hardware, software and upgrades as well as the cost of the in-house IT staff and/or consultants that provide training and technical support. TCO strategies mandate where and when to upgrade, the choice of upgrades and even decisions on leasing versus buying, and in-house IT professional as opposed to contract labor.

The recent development of the network computer or NC seemed to give IT professionals hope that users of legacy desktops and applications could be given the processing capabilities as mission critical systems without over taxing the IS budget. It was hoped that the TCO could be dramatically reduced from an estimate that ranged as high as $39,000.00 per desktop PC in early 1998. Simply stated, a NC is a computer with minimal memory, disk storage and processor power designed to connect to a network, especially the Internet. The idea behind NCs is that many users who are connected to a network don't need all the computer power they get from a typical personal computer, and that at least the processing power can be provided by a remote server location.

NCs are really a variation on an old idea—diskless workstations—which are computers that contain memory and a processor but no disk storage. Instead, they rely on a server to store data. NCs take this idea one step further by also minimizing the amount of memory and processor power required by the workstation. Network computers designed to connect to an Internet are sometimes called Internet boxes, Net PCs, and Internet appliances.

There are numerous varieties of NCs, but they mostly run a compact operating system that can be booted from the server. The operating system generally hosts a Web browser, which launches the Java Virtual Machine when a Java application is downloaded. The browser also downloads HTML pages from the intranet or Internet, as does any browser in a PC. One of the strongest arguments behind NCs is that they reduce the TCO—not only because the machines themselves are less expensive than PCs, but also because network computers can be administered and updated from a central network server.

Originally NCs were designed as "thin clients" that download all applications from the network server and obtain all of their data from a server and stored all changes back to a server. The attraction of the original NC concept is twofold. Since everything is maintained at the server side, software is installed and upgraded in one place rather than at each client station. And, of course, NCs are promoted as the best way to lower the cost of computer maintenance and therefore TCO.

However, the original NC concept has been somewhat tarnished with the introduction of Net PCs. The Net PC is a type of NC designed cooperatively by Microsoft and Intel. Net PCs can be configured as a fully loaded PC (fat clients) or as NCs (thin clients). The inclusion of additional legacy hardware devices enables the Net PC to support a wider range of applications than a typical NC. In some respects, the Net PC fat client configuration is really just a PC since it is able to install Windows and execute Windows applications locally from a server. The fat client configuration greatly increases the overall cost of the system, even when compared to a typically configured PC.

However, Net PCs also include features to simplify connecting it to a network and to administer it remotely. This is the Net PC's thin client configuration. As a thin client Net PCs function similar to NCs and obtain their operating system (OS) from a server. One major difference between typical NCs and Net PCs is that Net PCs have expanded hardware requirements even when configured as a thin client. For instance, a Net PC must have all necessary legacy hardware present for supporting certain applications or to successfully operate an OS locally. It must also have all the onboard hardware necessary for subsequent upgrading to a fat client or PC. These features make even the thin client configuration of a Net PC more expensive than a NC on a per unit basis. A more important consideration for IT professionals is that users of Net PCs tend to require more and more upgrades until the Net PC is configured equivalently to that of a PC, a very expensive PC. NC users, on the other hand, do not require constant upgrading because typical NCs do not allow for PC-type re-configuring; it is simply not possible to re-configure a NC as a PC. However, the same lack of hardware support for PC-type configurations that makes NCs popular among ITs and their superiors, makes them unpopular among certain users who realize a need for applications needing certain types of legacy hardware, as well as, OS processing.

It would be advantageous to provide a method for expanding local services supported by network computers with a minimum of additional on-board hardware.

SUMMARY OF THE INVENTION

The present invention relates to a system and method for virtualizing hardware that is not available to a system. Initially a system management interrupt (SMI) trap detects an application accessing a memory location associated with a physical hardware device. The SMI trap receives the device address for the address bus and compares that address with memory addresses for hardware devices being virtualized by virtual device simulators. If the address matches an available virtual hardware device, the SMI caches the address, intercepts and caches the corresponding IO instruction for the memory address and issues a SMI. A SMI handler receives the SMI and determines which virtual device simulator to call. Once activated by the SMI handler, the virtual device simulator interacts with the application and then returns control to the processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
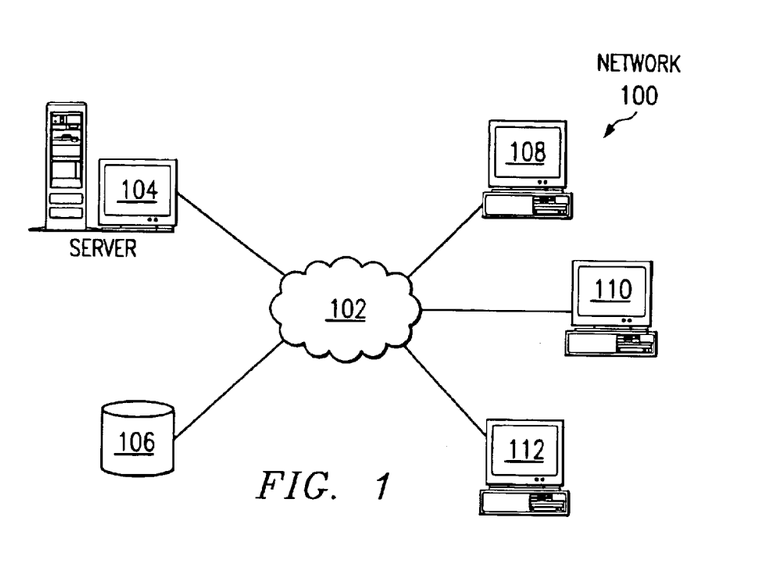
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
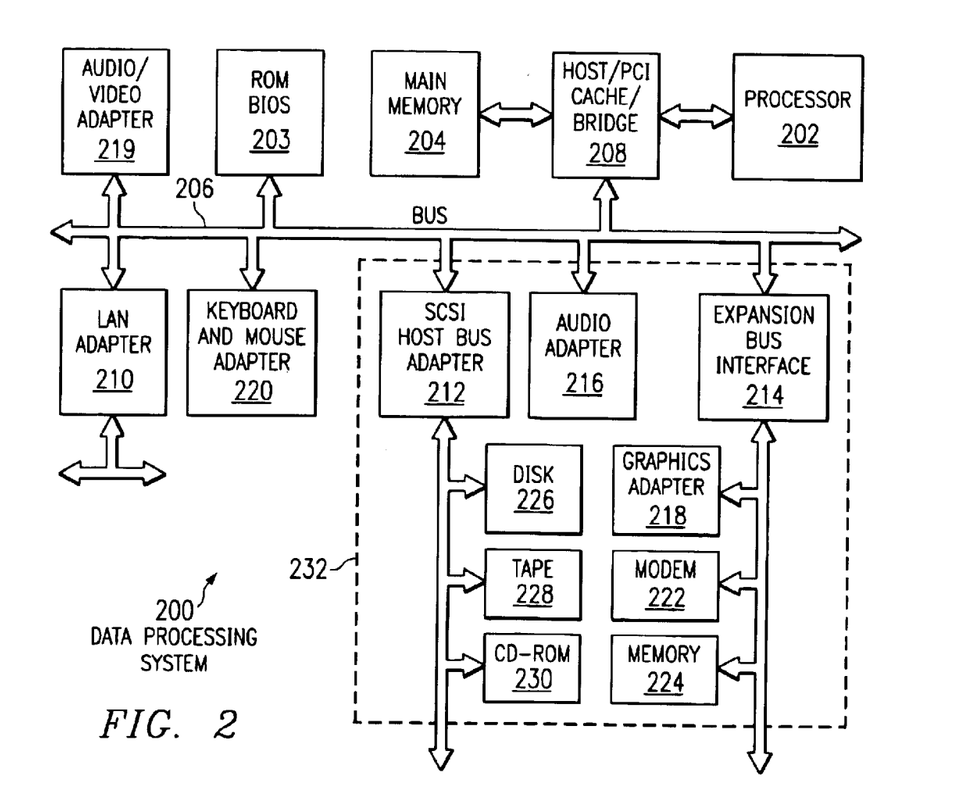
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 is connected to ROM BIOS (Read Only Memory Basic Input Output System) 203 through bus 206. ROM BIOS 203 is an essential set of routines in data processing system 200, which provides an interface between an operating system and client hardware. The BIOS supports all peripheral technologies and internal services such as system management interrupt (SMI) handler. On startup, the BIOS tests the system and prepares data processing system 200 for operation by querying its own small nonvolatile memory bank for the drive and other configuration settings. When configured as a PC, the BIOS searches for other BIOS's on the plug-in boards and sets up pointers (interrupt vectors) in memory to access those routines and actions to be taken in case of an SMI interrupt generated as an error as defined by the SMI handler. It then loads the operating system and passes control to it. The BIOS accepts requests from drivers as well as application programs. BIOS's must periodically be updated so if the BIOS are stored on a ROM chip, it must be replaced. Therefore, ROM BIOS 203 may either be a typical ROM or a flash memory that can be upgraded via software.

Processor 202 and main memory 204 are connected to PCI local bus 206 through host/PCI cache/bridge 208. Host/PCI cache/bridge 208 also may include an integrated memory controller and cache memory for processor 202. Audio/video adapter 219 and keyboard and mouse adapter 220 are also connected to PCI local bus 206, as well as LAN adapter 210 for connecting with a server.

When configured as a net computer (NC), data processing system 200 may be as thin as containing only processor 202, ROM BIOS 203, host/PCI cache/bridge 208, main memory 204, audio/video adapter 219, keyboard and mouse adapter 220 and LAN adapter 210. In the NC configuration, data processing system 200 relies on a server for all functionality depicted in dotted box 232 at the lower right quadrant of FIG. 2. That functionality includes storage capacity other than RAM used for main memory 204, the majority of OS and application processing, as well as a specialty processing such as, three-dimensional graphics and speech. Some NCs may also boot from a server thereby reducing or eliminating the role of ROM BIOS 203 as the server merely transmits a boot image to data processing system 200 containing much or all of the BIOS.

However, when data processing system 200 is configured as a PC or fat client additional connections to PCI local bus 206 may be made through direct component interconnection or through add-in boards. In the depicted example, SCSI host bus adapter 212, and expansion bus interface 214 are connected to PCI local bus 206 by direct component connection. In contrast, audio adapter 216, keyboard and mouse adapter 220, and audio/video adapter 219 are connected to PCI local bus 206 by add-in boards inserted into expansion slots. Expansion bus interface 214 provides a connection for a graphics adapter 218, modem 222, and additional memory 224. SCSI host bus adapter 212 provides a connection for hard disk drive 226, tape drive 228, and CD-ROM drive 230. Typical PCI local bus implementations support three or four PCI expansion slots or add-in connectors.

In PC configuration, an operating system runs on processor 202 and is used to coordinate and provide control of various components within data processing system 200 in FIG. 2. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2, as well as above-described examples, are not meant to imply architectural limitations.

As discussed above, NCs are limited in their appeal to certain users because of their inability to run a wide range of applications dependent on legacy hardware and because they do not perform certain local processing that can be accomplished on either a PC or a Net PC. However, NCs are very desirable to corporate IT professionals because of their low cost and centralized administration. However, providing a modification for a NC that allows the NC to perform a wider range of hardware with out greatly increasing its cost, size, or configurability would be desirable to both IT professionals and users. Especially those user who needed more local processing support or the ability to run applications not supported by NCs due to the absences of some legacy hardware.

Figure 3:
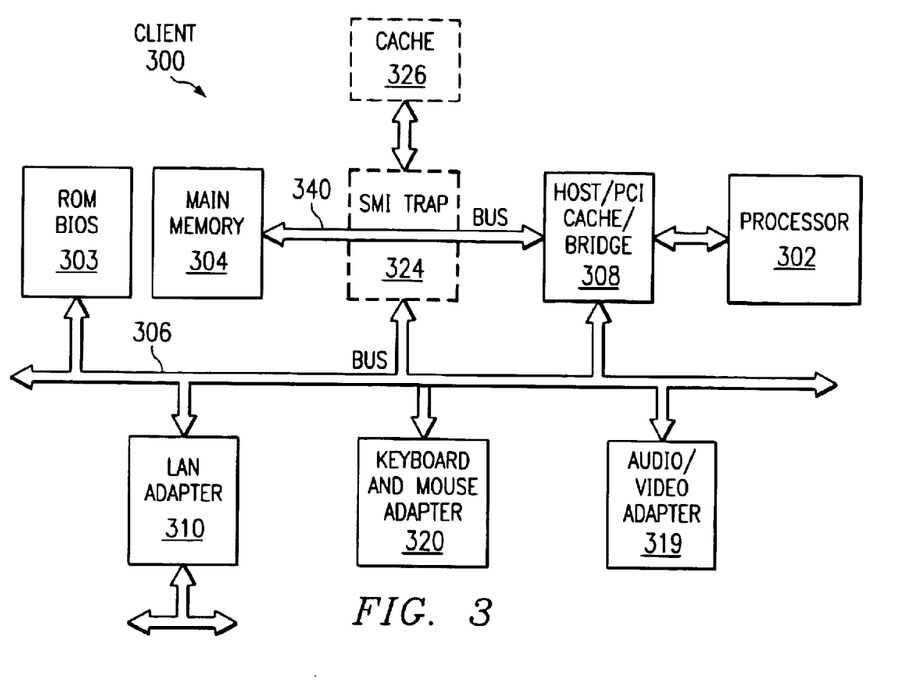
FIG. 3 is a block diagram illustrating a data processing system in accordance with a preferred embodiment of the present invention.

FIG. 3 is a block diagram illustrating a data processing system in accordance with a preferred embodiment of the present invention. Client 300 employs a peripheral component interconnect (PCI) local bus architecture or other bus architectures as described above with respect to FIG. 2. Processor 302 is connected to ROM BIOS 303. ROM BIOS 303 provides an interface between applications, drivers, and operating system and client hardware. The BIOS supports internal services such as system management interrupt (SMI) handler. The SMI handler will be discussed in greater detail with respect to the figures below in accordance with a preferred embodiment of the present invention. Processor 302 and main memory 304 are connected to PCI local bus 306 through PCI bridge 308. PCI bridge 308 also may include an integrated memory controller and cache memory for processor 302. Audio/video adapter 319 and keyboard and mouse adapter 320 are also connected to PCI local bus 306, as well as LAN adapter 310 for connecting with a server.

Client 300 differs from prior art NCs in that client 300 includes SMI trap 324 connected to bus 306. SMI trap 324 allows the present invention to simulate legacy hardware devices without modifying client 300 to include the physical legacy devices. Essentially, SMI trap 324 monitors the address bus portion of bus 340 located between processor 302 and main memory 304. A SMI trap is set for IO instructions at predefined addresses used to allocate to a specific legacy hardware device. The legacy hardware device is to be simulated with a virtual hardware simulation routine associated with a SMI handler. Both the virtual hardware simulation routine and the SMI handler reside in main memory 304.

SMI trap 324 quietly monitors bus 340 until an application needing the legacy hardware attempts to access address locations reserved for the legacy hardware. SMI trap 324 performs several functions when an IO instruction for a predetermined memory location is detected. First SMI trap 324 identifies the memory location being accessed and caches the memory address identity in SMI trap cache 326. SMI trap 324 then intercepts the corresponding IO instruction from the data bus portion of bus 340 and then caches the IO instruction and/or the instruction type, i.e. read, write, etc. in SMI trap cache 326. SMI trap cache 326 may be physically incorporated within SMI trap 324, allocated from main memory 304 or completely separate from either SMI trap 324 or main memory 304. Finally SMI trap 324 issues a system management interrupt (SMI) or SMI error message.

As discussed above with respect to FIG. 2, the SMI handler is is configured as a software routine or utility residing in the system ROM BIOS. Returning to FIG. 3, the SMI handler receives the SMI from SMI trap 324 and attempts to call a virtual hardware simulation routine that corresponds to the SMI. If the SMI handler cannot identify the corresponding virtual hardware simulator from the SMI, then the SMI handler must first read the information stored in SMI trap cache 326. Alternatively, SMI trap 324 may send a complete SMI error message that contains both the identity of the hardware device and the IO instruction type at the error type field of the IO instruction. In the latter case the SMI handler may have enough information to identify the corresponding virtual hardware simulator without accessing SMI trap cache 326.

In any event, the virtual hardware simulator will access SMI trap cache 326 as needed for interacting with the application. During the interaction, the application responds as if it were interacting with the physical hardware device. The virtual hardware simulator determines the proper action needed to simulate a hardware response for the application. For example, if the IO instruction detected by SMI trap 324 is a WRITE for a floppy disk controller, the virtual hardware simulator would convert WRITE instructions for a floppy controller to WRITE instructions supported by the NC's server and write the data to the server. This conversion would be hidden from the application that intends to write to a local floppy drive. Upon completion of the virtual hardware simulator interaction, the virtual hardware simulator de-allocates the SMI handler and control is returned to the physical hardware and/or processor present in the NC.

Figure 4:
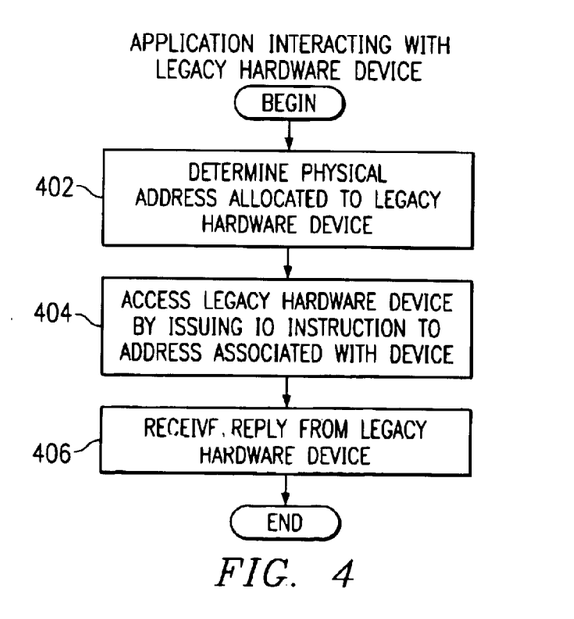
FIG. 4 is a flowchart depicting a process for application interaction with a legacy hardware device.
Figure 5:
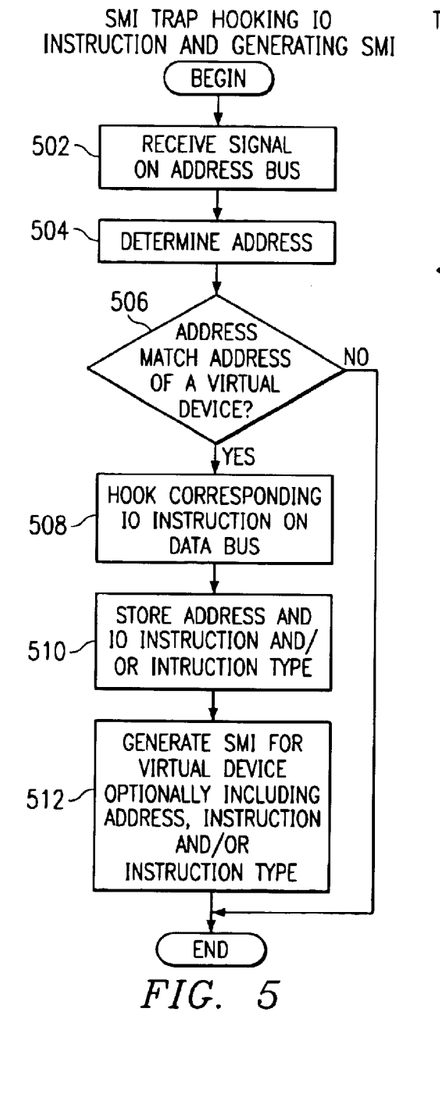
FIG. 5 is a flowchart depicting a process for hooking an IO instruction and generating an SMI in accordance with a preferred embodiment of the present invention.
Figure 6:
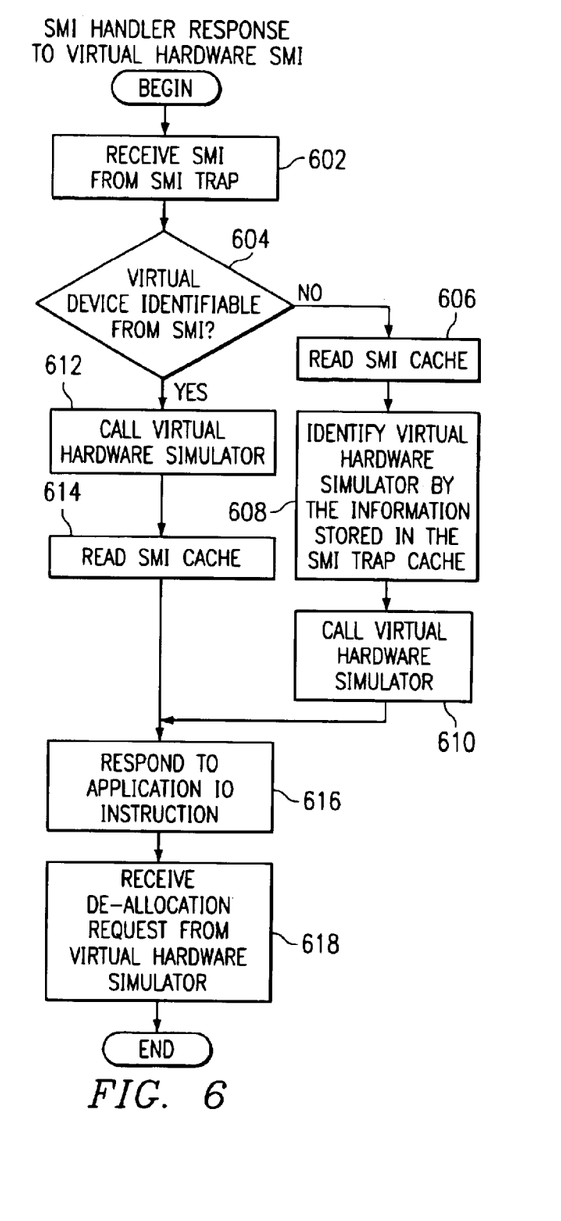
FIG. 6 is a flowchart depicting a process in which the SMI handler responds to a SMI in accordance with a preferred embodiment of the present invention.

FIGS. 4–6 are flowcharts depicting the virtualizing hardware components using system management interrupts in accordance with a preferred embodiment of the present invention. The present invention utilizes a modified system management interrupt (SMI) handler as a mechanism for interacting with an application. Typically, a SMI handler is the means of detecting system errors and logging error messages into the system error log. The SMI handler resides in system ROM BIOS and detects system errors, or SMIs, that are normally generated by system hardware such as a CPU, memory, and PCI devices. However, in accordance with a preferred embodiment of the present invention the SMIs are also generated by a SMI trap that responds to IO instructions at specific addresses when addresses which correspond to a particular hardware device are accessed. The SMI handler of the present invention is modified with hardware simulation algorithms for implementing physical hardware components as software and responses to SMIs generated by the SMI trap.

Figure 7A:
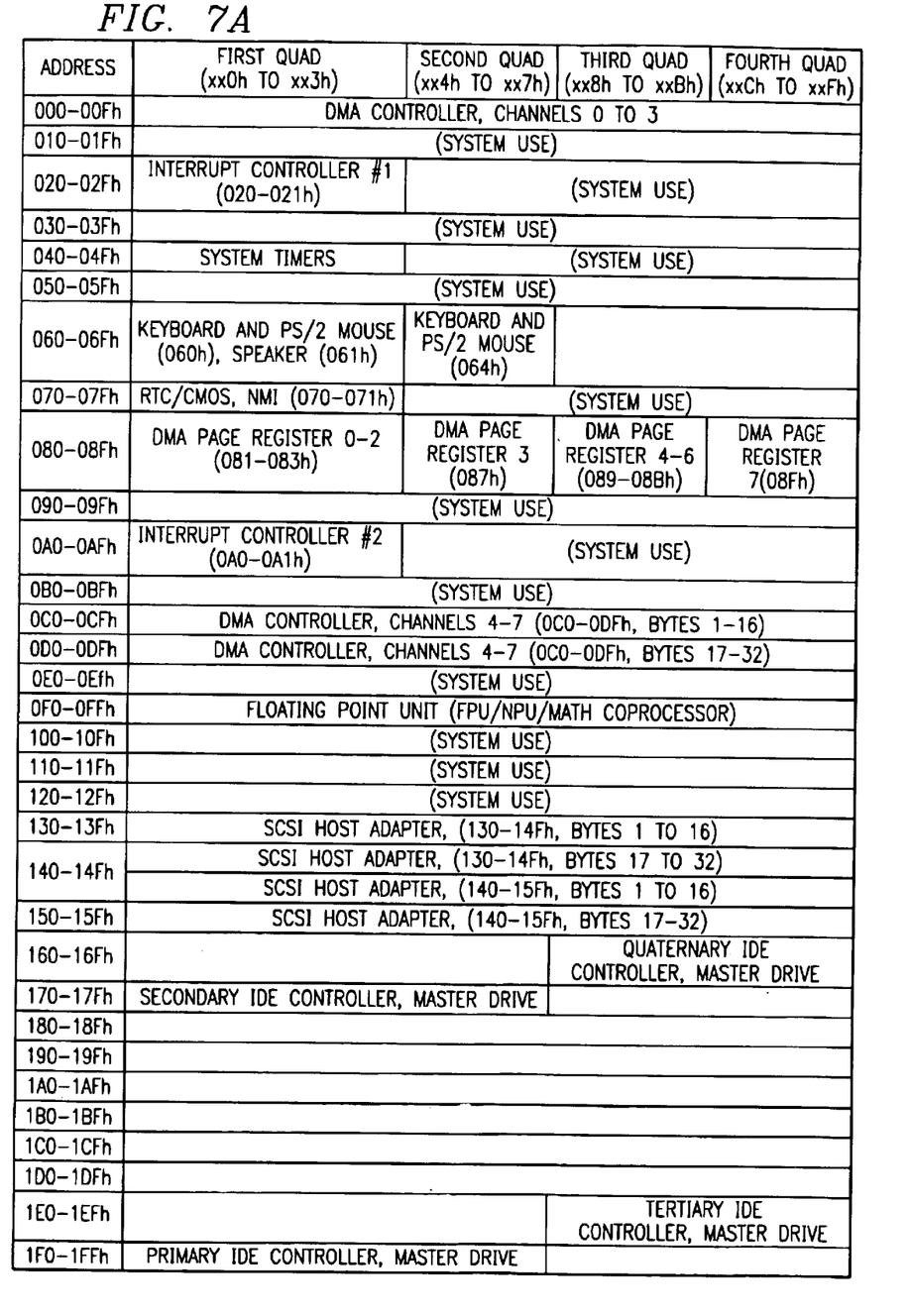
FIGS. 7A–7C are a representative table showing the relationship between system addresses and hardware device identifiers in a typical personal computer.
Figure 7B:
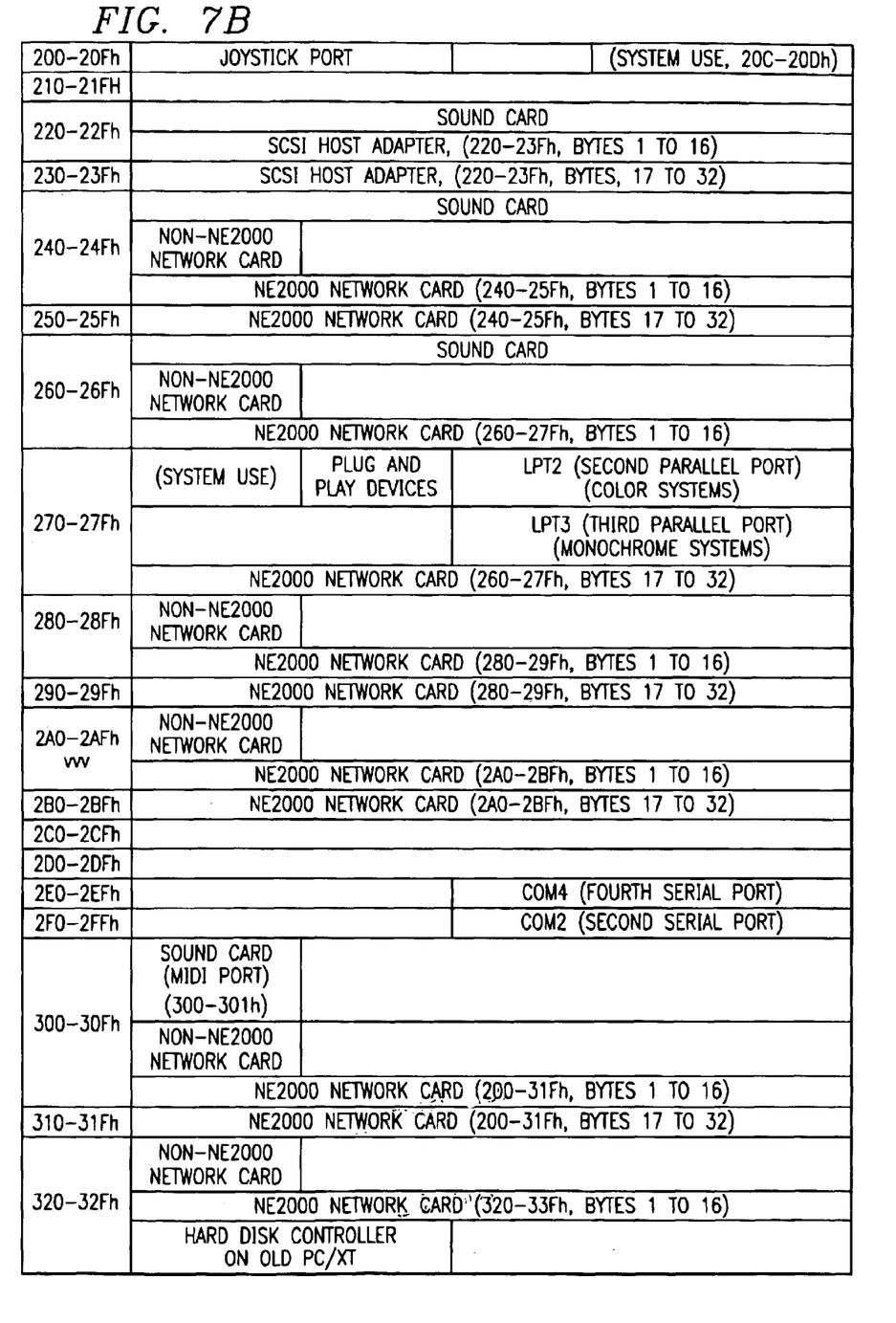
Figure 7C:
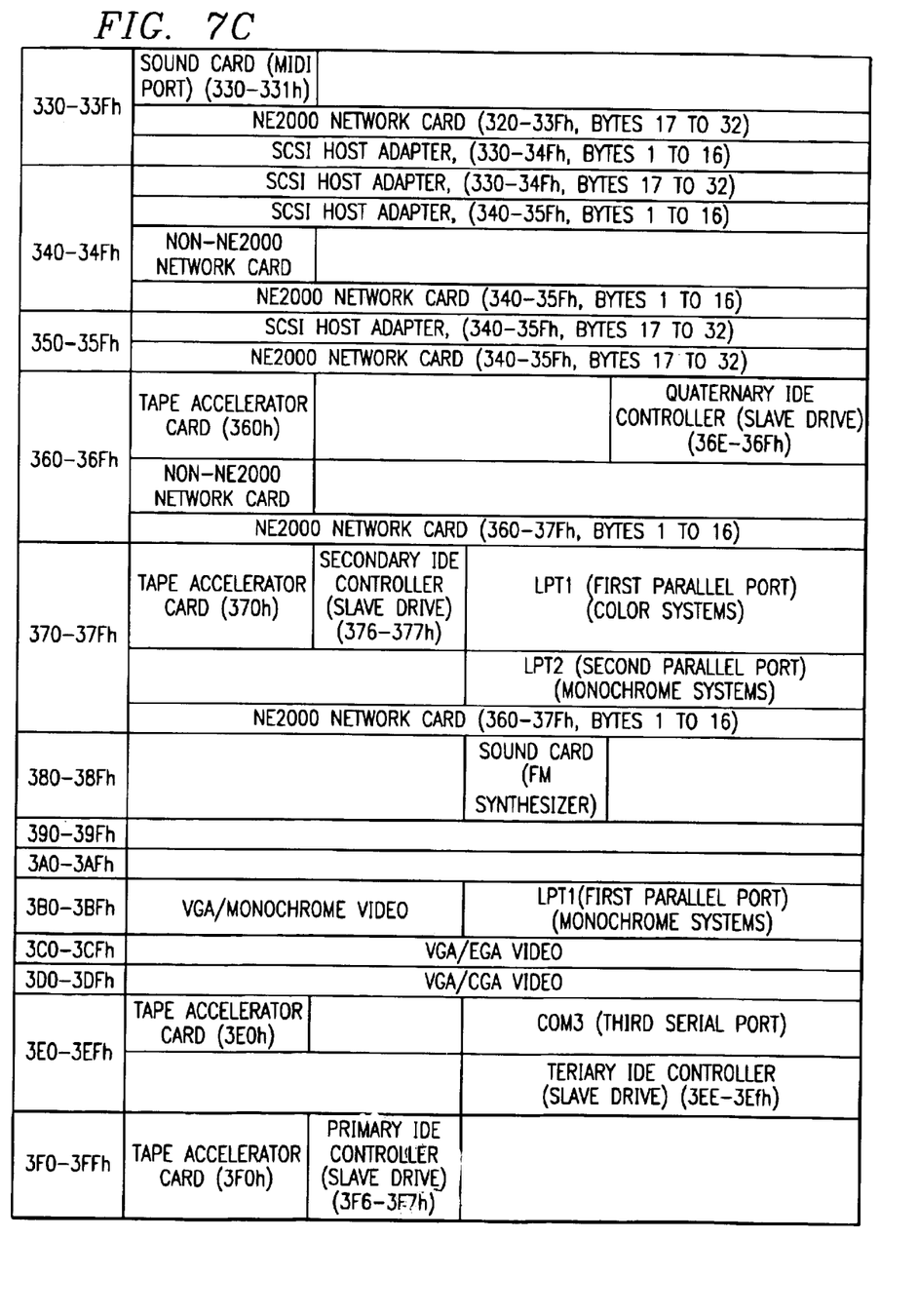

FIG. 4 is a flowchart depicting a process for application interaction with a legacy hardware device. The process begins with the application determining the physical address that has been allocated to a particular legacy hardware device(step 402). Generally the physical address of the device has been coded in the instruction itself, however, alternative means may be employed such as maintaining a relational table cross-referencing physical addresses with hardware device nomenclatures. In that way, if memory space is reallocated, only the table need be changed. An advantage of the latter case is that every application containing code that references device nomenclatures need not be changed in response to the corresponding device addresses being reassigned when the device nomenclatures are unchanged. FIGS. 7A–7C are a representative table showing the relationship between system addresses and hardware device identifiers in a typical personal computer.

Returning to FIG. 4, after the physical address has been determined the application accesses the legacy hardware device by issuing an IO instruction to the address associated with the device (step 404). Finally, the application receives a reply from the legacy hardware device (step 406). Importantly, the application has no way of knowing if the physical legacy device is present or not until the reply is received. Even then, the application has no way of determining whether or not the target legacy device actually replied or if the reply was generated by another component, such as, a virtual hardware device, mimicking the target legacy device. However, the primary problem to overcome is diverting the IO instruction to a virtual device and then substituting its response for the response from a real device without getting an invalid response from the target address of the IO instruction. This problem is overcome by hooking the IO instruction and responding the application prior to a system time out being issued.

FIG. 5 is a flowchart depicting a process for hooking an IO instruction and generating an SMI in accordance with a preferred embodiment of the present invention. As discussed above, the method depicted below is carried out by an SMI trap which is physically attached to an address bus connected to the system main memory. From that location the SMI can monitor all addresses within the main memory and signal the SMI handler when a hardware device is to be virtualized.

The process begins by the SMI trap receiving a signal on the address bus (step 502). Addresses are sent over the address bus to signal a memory location that data will follow. A physical memory address associated with the signal is then determined (step 504). The SMI trap response to activity in only pre-selected memory locations. Each time a memory address appears on the address bus the SMI trap compares the address with a list of memory addresses corresponding to virtual hardware devices (step 506). If the memory address does not match a memory location of a legacy device currently being simulated by a virtual hardware device the process ends. If, on the other hand, the memory address being transmitted on the address bus does match a virtual hardware device, the corresponding IO instruction on the data bus is intercepted or hooked (step 508). Both the address and the IO instruction and/or the IO instruction type (read, write etc.) are stored (step 510). Finally, the SMI trap generates a system management interrupt (SMI) message indicating that an instruction for a legacy hardware device has been intercepted (step 512). Importantly, the SMI message may be formatted in one of several manners. For example, the SMI may issue an SMI message that only identifies the SMI trap as the originating physical hardware device. Alternatively, the SMI message may include both the identity of the SMI trap and information received by the SMI trap such as the memory address and IO instruction. The process then ends.

The present invention allows IT professionals to upgrade a typically configured NC sufficiently enough to run a variety of applications which require local legacy hardware. In addition, the present invention provides a convenient means for replacing faulty or out-of-date hardware components with virtual hardware devices. The sole hardware modification for implementing the present invention involves fitting a SMI trap to the main memory bus. The remaining features of the present invention are software implemented including the virtual hardware devices. In accordance with a preferred embodiment of the present invention, hardware simulation algorithms are incorporated within the SMI handler that mimic the operation of any physical hardware device being virtualized.

FIG. 6 is a flowchart depicting a process in which the SMI handler responds to a SMI message in accordance with a preferred embodiment of the present invention. The process begins with the SMI handler receiving a SMI message from the SMI trap (step 602). A virtual hardware device must be discernible from the content of a SMI message. A check is made as to whether the virtual hardware device can be identified from the SMI (step 604). This is an optional step if the SMI format has been predetermined, however, by checking the SMI content for information that relates to the identity of the virtual hardware device, a generic SMI handler can be configured on all systems regardless of the SMI message format. If a virtual hardware device cannot be identified from the SMI content, then the SMI handler must access the SMI trap cache for additional information needed to select the proper virtual hardware device simulator (step 606). Having read the SMI trap cache, the SMI handler can identify the proper virtual hardware device (step 608).

Figure 8:
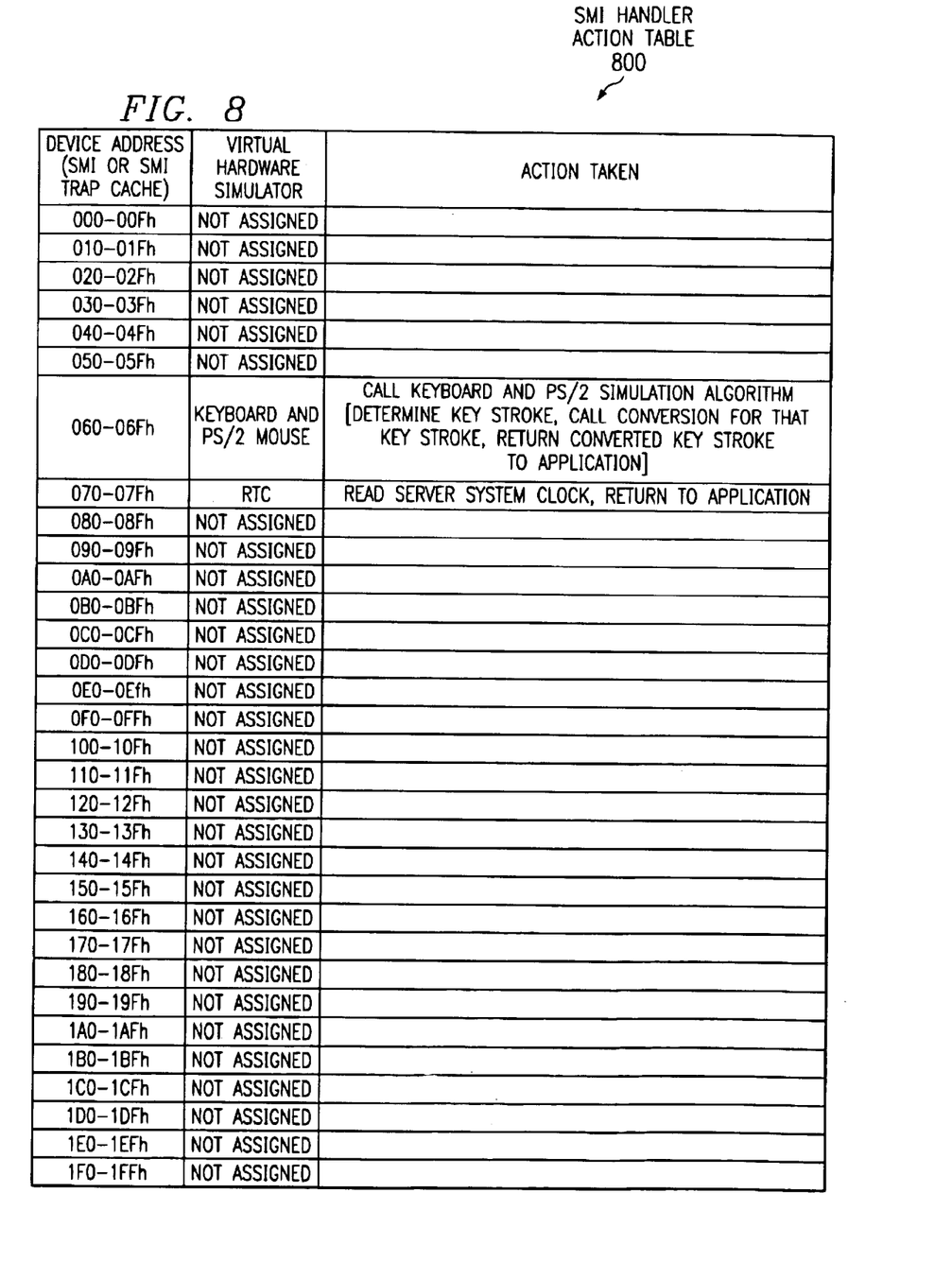
FIG. 8 is a table depicting a virtual hardware simulator table.

A virtual hardware simulator can be identified by a number of mechanisms including constructing a virtual hardware simulator table such as that shown in FIG. 8. In accordance with table 800 virtual hardware devices are referenced by main memory locations allocated to corresponding physical hardware device. Therefore, the SMI handler selects a virtual hardware simulator by ascertaining the main memory locations allocated to the physical hardware device. Note that memory addresses 060–06Fh are allocated to a physical keyboard and PS/2 mouse. In this case, if the SMI handler receives a SMI containing those addresses, the SMI handler will call a virtual keyboard and PS/2 mouse simulator. This might be helpful where a legacy application does not support non-QWERTY or bat chording keyboards. Note also that table 800 includes a RTC simulator corresponding to memory locations 070–07Fh. In this case though, the action needed to be taken by the SMI handler is simple enough to merely be written into the table. Thus, when memory locations corresponding to a physical RTC (real time clock) are received, the SMI handler merely reads the server's system clock and returns that value to the application.

Regardless, once a hardware device is identified the proper virtual hardware simulator is then called (step 610).

Returning to step 604, if the SMI message contains a virtual hardware identifier, such as, the device memory address, the proper virtual hardware device simulator can be called (step 612). It is assumed that the SMI will not contain the IO instruction itself, although one of ordinary skill in the art would realize that it would be possible to include the hooked IO instructions within the SMI message. The SMI handler then accesses the SMI trap cache for the IO instruction (step 614). Finally, the virtual hardware device performs the necessary function (step 616) and then sends a de-allocation request to the SMI handler, which returns control to the processor (step 618). The process then ends.

The present invention allows IT professionals to upgrade NCs with a minimum of hardware modifications. Once the present invention is incorporated, the NC can support applications requiring legacy hardware devices by calling virtual hardware devices to respond to the application IO instruction for the legacy hardware. NCs can thus run a variety of applications requiring local legacy hardware heretofore unsupported by network computers. Additionally, the present invention provides a convenient means for replacing faulty or out-of-date hardware components with virtual hardware devices. Essentially, most hardware devices could be backed-up by a corresponding virtual hardware simulator. If a device fails then the application need not be interrupted because the SMI handler would merely activate a corresponding virtual hardware simulator. It is envisioned that the process would be triggered by a system time out due the physical hardware device being unresponsive. In prior art systems a SMI message would be normally generated. In the present invention, the SMI handler instructs the SMI trap to intercept corresponding IO instructions for the faulty physical device in addition to generating an SMI message and logging the device error.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as, floppy discs, hard disk drives, RAM, CD-ROMS, and transmission-type media, such as, digital and analog communication links.

The description of the present invention has been presented for the purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for virtualizing hardware with system management interrupts comprising the step of:
   receiving an indication that an application intends to communicate with a physical hardware device, wherein receiving an indication that an application intends to communicate with a hardware device further comprises the step of:
   monitoring an address bus;
   receiving a memory address that corresponds to the physical hardware device;
   intercepting an input output (IO) instruction intended for the memory address; and
   caching the memory address and the input output (IO) instruction;
   issuing a system management interrupt (SMI) message in response to receiving the indication;
   identifying a virtual hardware device simulator, wherein identifying a virtual hardware device simulator further comprises the steps of:
   comparing the memory address with at least one reference memory address, wherein each reference memory address corresponds to the virtual hardware device simulator;
   matching the memory address with a reference memory address; and
   calling a virtual hardware device simulator, wherein the virtual hardware device simulator corresponds to the reference memory address that matched the memory address; and
   responding to the application using the virtual hardware device simulator.

2. The method recited in claim 1, wherein the system management interrupt (SMI) message comprises the memory address.

3. The method recited in claim 1, wherein the system management interrupt (SMI) message comprises the input output (IO) instruction intended for the memory address.

4. The method recited in claim 1, wherein the system management interrupt (SMI) message comprises a type of input output (IO) instruction intended for the memory address.

5. The method recited in claim 1, wherein the memory address is contained in the system management interrupt (SMI) message.

6. The method recited in claim 1, wherein the memory address is contained in cache.

7. The method recited in claim 1, wherein responding to the application using the virtual hardware device simulator comprises the step of:
   mimicking a response to the application generated by the physical hardware device.

8. A data processing system implemented method for vitalizing hardware with system management interrupts comprising the step of:
   trapping an input output (IO) instruction intended for a physical hardware device;
   caching the input output (IO) instruction;
   issuing a system management interrupt (SMI) message in response to trapping the input output (IO) instruction;
   receiving the system management interrupt (SMI) message;
   calling a virtual hardware device simulator in response to receiving the system management interrupt (SMI) message; and responding to the input output (IO) instruction using the virtual hardware device simulator, wherein the virtual hardware device simulator is identified by the steps of:
comparing the memory address with at least one reference memory address, wherein each reference memory address corresponds to the virtual hardware device simulator;
matching the memory address with a reference memory address; and
calling a virtual hardware device simulator, wherein the virtual hardware device simulator corresponds to the reference memory address that matched the memory address.

9. A data processing system for virtualizing hardware with system management interrupts comprising:
receiving means for receiving an indication that an application intends to communicate with a physical hardware device, wherein the receiving means for receiving an indication that an application intends to communicate with a hardware device further comprises:
monitoring means for monitoring an address bus;
receiving means for receiving a memory address that corresponds to the physical hardware device;
intercepting means for intercepting an input output (IO) instruction intended for the memory address; and
caching means for caching the memory address and the input output (IO) instruction;
issuing means for issuing a system management interrupt (SMI) message in response to receiving the indication;
identifying means for identifying a virtual hardware device simulator, wherein the identifying means for identifying the virtual hardware device simulator further comprises:
comparing means for comparing the memory address with at least one reference memory address, wherein each reference memory address corresponds to the virtual hardware device simulator;
matching means for matching the memory address with a reference memory address; and
calling means for calling a virtual hardware device simulator, wherein the virtual hardware device simulator corresponds to the reference memory address that matched the memory address; and
responding means for responding to the application using the virtual hardware device simulator.

10. The system recited in claim 9, wherein the system management interrupt (SMI) message comprises the memory address.

11. The system recited in claim 9, wherein the system management interrupt (SMI) message comprises the input output (IO) instruction intended for the memory address.

12. The system recited in claim 9, wherein the system management interrupt (SMT) message comprises a type of input output (IO) instruction intended for the memory address.

13. The system recited in claim 9, wherein the memory address is contained in the system management interrupt (SMI) message.

14. The system recited in claim 9, wherein the memory address is contained in cache.

15. The system recited in claim 9, wherein the responding means for responding to the application using the virtual hardware device simulator comprises:
mimicking means for mimicking a response to the application generated by the physical hardware device.

16. A data processing system for virtualizing hardware with system management interrupts comprising:
trapping means for trapping an input output (IO) instruction intended for a physical hardware device;
caching means for caching the input output (IO) instruction;
issuing means for issuing a system management interrupt (SMI) message in response to trapping the input output (IO) instruction;
receiving means for receiving the system management interrupt (SMI) message;
calling means for calling a virtual hardware device simulator in response to receiving the system management interrupt (SMI) message; and
responding means for responding to the input output (IO) instruction using the virtual hardware device simulator, wherein the virtual hardware device simulator is identified by identifying means comprising:
comparing means for comparing the memory address with at least one reference memory address, wherein each reference memory address corresponds to the virtual hardware device simulator;
matching means for matching the memory address with the reference memory address; and
calling means for calling a virtual hardware device simulator, wherein the virtual hardware device simulator corresponds to the reference memory address that matched the memory address.

17. A data processing system implemented virtualizing hardware with system management interrupts comprising:
a bus;
a main memory connected to the bus;
a system management interrupt (SMI) trap affixed to the bus, wherein the system management interrupt (SMI) trap receives a memory address from the bus that indicates that an application intends to communicate with a physical hardware device and in response issues a system management interrupt (SMI) message, wherein the memory address and an input output (IO) instruction is cached
a system management interrupt (SMI) handler, wherein the system management interrupt (SMI) handler is a data structure stored in the main memory which receives the system management interrupt (SMI) message and responds to the system management interrupt (SMI) message by identifying the virtual hardware device simulator that corresponds to the physical device and interacts with the application, wherein identifying a virtual hardware device simulator further compares the memory address with at least one reference memory address, wherein each reference memory address corresponds to the virtual hardware device simulator, matches the memory address with a reference memory address; and calls a virtual hardware device simulator, wherein the virtual hardware device simulator corresponds to the reference memory address that matched the memory address.

18. A data processing system recited in claim 17 further comprises:
a system management interrupt (SMI) handler, wherein the system management interrupt (SMI) handler is a data structure stored in the main memory which receives the system management interrupt (SMI) message;
a plurality of virtual hardware device simulators, wherein each of the plurality of virtual hardware device simulators is a program routine stored in the main memory, associated with the system management interrupt (SMI) handler and mimics a response from a physical hardware device.

19. A data processing system implemented computer program product for virtualizing hardware with system management interrupts comprising:

receiving instructions for receiving an indication that an application intends to communicate with a physical hardware device, wherein the receiving instructions for receiving an indication that an application intends to communicate with a hardware device further comprises the step of:
monitoring instructions for monitoring an address bus;
receiving instructions for receiving a memory address that corresponds to the physical hardware device;
intercepting instructions for intercepting an input output (IO) instruction intended for the memory address; and
caching instructions for caching the memory address and the input output (IO) instruction;

issuing instructions for issuing a system management interrupt (SMI) message in response to receiving the indication;

identifying instructions for identifying a virtual hardware device simulator, wherein identifying a virtual hardware device simulator further comprises the steps of:
comparing instructions for comparing the memory address with at least one reference memory address, wherein each reference memory address corresponds to the virtual hardware device simulator;
matching instructions for matching the memory address with a reference memory address; and
calling instructions for calling a virtual hardware device simulator, wherein the virtual hardware device simulator corresponds to the reference memory address that matched the memory address; and responding instructions for responding to the application using the virtual hardware device simulator.

20. A data processing system implemented computer program product for virtualizing hardware with system management interrupts comprising:

trapping instructions for trapping an input output (IO) instruction intended for a physical hardware device;

caching instructions for caching the input output (IO) instruction;

issuing instructions for issuing a system management interrupt (SMI) message in response to trapping the input output (IO) instruction;

receiving instructions for receiving the system management interrupt (SMI) message;

calling instructions for calling a virtual hardware device simulator in response to receiving the system management interrupt (SMI) message; and responding instructions for responding to the input output (IO) instruction using the virtual hardware device simulator, wherein the virtual hardware device simulator is identified by the steps of:
comparing instructions for comparing the memory address with at least one reference memory address, wherein each reference memory address corresponds to the virtual hardware device simulator;
matching instructions for matching the memory address with a reference memory address; and
calling instructions for calling a virtual hardware device simulator, wherein the virtual hardware device simulator corresponds to the reference memory address that matched the memory address.

* * * * *